(12) United States Patent
Hasumi et al.

(10) Patent No.: US 11,588,846 B2
(45) Date of Patent: Feb. 21, 2023

(54) NETWORK CONTROL DEVICE AND NETWORK CONTROL METHOD

(71) Applicant: NEC CORPORATION, Tokyo (JP)

(72) Inventors: Daichi Hasumi, Tokyo (JP); Satoshi Ikeda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 16/963,757

(22) PCT Filed: Jan. 22, 2018

(86) PCT No.: PCT/JP2018/001745
§ 371 (c)(1),
(2) Date: Jul. 21, 2020

(87) PCT Pub. No.: WO2019/142348
PCT Pub. Date: Jul. 25, 2019

(65) Prior Publication Data
US 2020/0358813 A1    Nov. 12, 2020

(51) Int. Cl.
*H04L 9/40*    (2022.01)

(52) U.S. Cl.
CPC ...... *H04L 63/1441* (2013.01); *H04L 63/1416* (2013.01); *H04L 63/20* (2013.01)

(58) Field of Classification Search
CPC . H04L 63/1441; H04L 63/1416; H04L 63/20; G06F 21/55
(Continued)

(56) References Cited

U.S. PATENT DOCUMENTS

| 8,826,438 B2* | 9/2014 | Perdisci | H04L 63/145 |
| | | | 709/236 |
| 2013/0144973 A1* | 6/2013 | Li | H04L 45/16 |
| | | | 709/217 |

(Continued)

FOREIGN PATENT DOCUMENTS

| JP | 2016-184870 A | 10/2016 |
| JP | 2017-034659 A | 2/2017 |

(Continued)

OTHER PUBLICATIONS

"CSIRT Guide", Japan Computer Emergency Response Team Coordination Center, Nov. 2015, 36 pages.

(Continued)

*Primary Examiner* — Teshome Hailu
(74) *Attorney, Agent, or Firm* — Sughrue Mion, PLLC

(57) ABSTRACT

Provided is a network control device 2000 for controlling a network where a plurality of terminals and countermeasure devices are connected, the network control device 2000 including: a clustering unit 2001 that divides terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and a communication control setting unit 2002 that sets communication control relating to the terminals and the countermeasure devices for each of the plurality of zones.

9 Claims, 19 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2016/0028754 | A1* | 1/2016 | Cruz Mota | H04L 63/1425 726/23 |
| 2017/0063909 | A1* | 3/2017 | Muddu | H04L 63/1425 |
| 2018/0191758 | A1* | 7/2018 | Abbaszadeh | H04L 63/1425 |
| 2018/0375880 | A1* | 12/2018 | Dakshinamoorthy | H04L 63/1425 |
| 2019/0089737 | A1* | 3/2019 | Shayevitz | H04L 63/1491 |

FOREIGN PATENT DOCUMENTS

| | | |
|---|---|---|
| JP | 2017-063336 A | 3/2017 |
| JP | 2017-211978 A | 11/2017 |
| WO | 2016/080232 A1 | 5/2016 |

OTHER PUBLICATIONS

"Ponemon Institute's 2017 Cost of Data Breach Study: Global Overview", Ponemon Institute, https://www-01.ibm.com/marketing/iwm/dre/signup?source = urx-15763, Nov. 2017 search, 2 pages.

"Analysis of Attack Campaign Relentlessly Targeting Specific Industries", Security Center, Technology Division, Information-technology Promotion Agency, Cyber Rescue Team (J-CRAT) Analysis Report 2015, Jun. 2016, 31 pages.

Hirokazu Hasegawa et al., "A Countermeasure Recommendation System against Targeted Attacks with Preserving Continuity of Internal Networks", 2014 IEEE 38th Annual International Computers, Software and Applications Conference, 6 pages.

Michelle Girvan et al., "Community structure in social and biological networks", Proceedings of the National Academy of Sciences, 2002, vol. 99. No. 12, pp. 7821-7826, 6 pages.

Linton C. Freeman, "A Set of Measures of Centrality based on Betweenness", Sociometry, 1977, vol. 40, No. 1, pp. 35-41, 7 pages.

International search report for PCT/JP2018/001745 dated Mar. 13, 2018.

Written opinion for PCT/JP2018/001745 dated Mar. 13, 2018.

Japanese Office Action for JP Application No. 2019-565677 dated Aug. 3, 2021 with English Translation.

* cited by examiner

FIG. 4

| IDENTIFIER (IP) | DETECTION |
|---|---|
| 192.168.1.32 | No |
| 192.168.1.24 | No |
| 192.168.1.82 | No |
| 192.168.1.12 | No |
| 192.168.1.10 | No |
| 192.168.1.68 | No |
| 192.168.2.8 | Yes |
| 192.168.1.21 | No |
| 192.168.1.44 | No |
| 192.168.1.43 | No |
| ⋮ | ⋮ |

FIG. 5

| SOURCE IDENTIFIER (IP) | DESTINATION IDENTIFIER (IP) |
|---|---|
| 192.168.1.32 | 192.168.1.82 |
| 192.168.1.82 | 192.168.1.10 |
| 192.168.2.8 | 192.168.1.21 |
| 192.168.1.43 | 192.168.1.44 |
| 192.168.1.43 | 192.168.1.82 |
| 192.168.1.10 | 192.168.1.22 |
| 192.168.1.68 | 192.168.1.21 |
| 192.168.1.68 | 192.168.1.32 |
| 192.168.1.82 | 192.168.1.22 |
| 192.168.1.43 | 192.168.1.12 |
| ⋮ | ⋮ |

FIG. 6

| COUNTERMEASURE DEVICE IDENTIFIER | NAME | IP | SETTING PROFILE | API Type | ZONE |
|---|---|---|---|---|---|
| App1 | Snort | 192.168.0.65 | P01 | OpenC2 | 1 |
| App1 | Snort | 192.168.0.65 | P02 | OpenC2 | 2 |
| ... | ... | ... | ... | ... | ... |
| App2 | FireEye NX | 192.168.0.66 | P06 | Native | 3 |
| ... | ... | ... | ... | ... | ... |

FIG. 8

| SDN SWITCH IDENTIFIER | TARGET SEGMENT |
|---|---|
| sw01 | 192.168.1.0/24 |
| sw01 | 192.168.1.0/24 |
| ⋮ | ⋮ |
| sw02 | 192.168.2.0/24 |
| ⋮ | ⋮ |

FIG. 9

| TERMINAL IDENTIFIER | ZONE | SDN SWITCH IDENTIFIER | COMMUNICATION CONTROL SETTINGS |
|---|---|---|---|
| 192.168.2.8 | 1 | sw01 | C01 |
| ... | ... | ... | ... |
| 192.168.1.21 | 2 | sw02 | C02 |
| ... | ... | ... | ... |

NETWORK CONTROL DEVICE AND NETWORK CONTROL METHOD

CROSS-REFERENCE TO RELATED APPLICATIONS

This application is a National Stage of International Application No. PCT/JP2018/001745 filed on Jan. 22, 2018.

TECHNICAL FIELD

The present invention relates to a network control device and a network control method for controlling communication of a terminal group according to a terminal group suspected of being affected by an incident.

BACKGROUND ART

Information security measures in an information technology (IT) system are increasingly seen as important. In terms of information security, an event that may pose a threat is called an incident. Incident management for an incident occurrence is under consideration (see Non Patent Literature [NPL] 1). Particularly, measures against incident occurrence (incident responses) are important (refer to, for example, NPL 2 and NPL 3).

NPL 4 also describes techniques related to incident responses. Specifically, NPL 4 describes a technique for performing an access control in network segment units for an organization in which the incident has occurred, according to the progress of the incident and the expected amount of damage. The access control in the literature concerned means whether or not it is possible to perform an access to an external network such as the Internet or an access to another internal network segment.

Other techniques related to incident responses include, for example, those described in Patent Literatures (PTLs) 1 and 2.

PTL 1 discloses a method for dynamically assigning a required service to terminals connected to a local area network (LAN) on the basis of predefined rules, considering a security appliance as a service. PTL 1 further discloses a method of isolating a terminal in which an incident is detected (an incident-detected terminal) in a logical isolation zone and modifying the security requirements of the isolated terminal.

PTL 2 discloses a method of calculating a coping process on the basis of the preset incident response rules and scores and changing the communication paths of the incident-detected terminal and other terminals belonging to a network segment to which the incident-detected terminal belongs.

CITATION LIST

Patent Literatures

PTL 1: Japanese Patent Application Laid-Open No. 2017-34659
PTL 2: Japanese Patent Application Laid-Open No. 2017-63336 Non Patent Literatures
NPL 1: "CSIRT Guide," JPCERT Coordination Center, Nov. 26, 2015
NPL 2: Ponemon Institute, "Ponemon Institute's 2017 Cost of Data Breach Study: Global Overview," [Nov. 3, 2017 search], the Internet <URL https://www-01.ibm.com/marketing/iwm/dre/signup? source=urx-15763>
NPL 3: Security Center, Technology Division, Information-technology Promotion Agency, "Analysis of Attack Campaign Relentlessly Targeting Specific Industries" (Cyber Rescue Team (J-CRAT) Analysis Report 2015), Jun. 29, 2016
NPL 4: Hirokazu Hasegawa et al., "A Countermeasure Recommendation System against Targeted Attacks with Preserving Continuity of Internal Networks", 2014 IEEE 38th Annual International Computers, Software and Applications Conference
NPL 5: Girvan, Michelle and Mark EJ Newman, "Community structure in social and biological networks," Proceedings of the national academy of sciences 99.12 (2002), pp. 7821-7826
NPL 6: Freeman, Linton C, "A set of measures of centrality based on betweenness," Sociometry Vol. 40 No. 1 (1977), pp. 35-41

SUMMARY OF INVENTION

Technical Problem

There are many targeted attacks that illegally invade terminals and networks of companies and government offices and bring out technical information and personal information, thereby causing damage to the target companies and government offices and hindering operations. Such targeted attacks generally target not only system vulnerabilities but also human cognitive and judgment vulnerabilities. It is difficult for conventional boundary defense type information security products to completely prevent targeted attacks. In fact, it has been reported that it took 190 days to detect a targeted attack and 66 days to deal with it (see NPL 2). Therefore, a new countermeasure technique against targeted attacks is required.

As a characteristic of a targeted attack, the targeted attack includes an attack stage such as an internal reconnaissance activity (lateral movement) for acquiring a more suitable authority to operate other internal terminals for an attacker who has acquired the authority to operate terminals in a target organization to achieve an attack purpose. For that reason, it is quite possible that the attacker has the authority to operate a plurality of terminals in the network system targeted by the attacker. Therefore, even if only terminals detected by a security appliance, a malware analysis environment (sandbox), and the like (hereinafter, these are collectively referred to as "countermeasure devices") are disconnected from the network, an incident reoccurs, that is, an incident response fails problematically.

The above techniques (techniques described in NPLs 2 to 4 and PTLs 1 and 2) are able to deal with the foregoing problem. In other words, access control is performed for the terminals in the network segment to which an incident-detected terminal belongs. The communication path of a specific network segment may be changed, so that the incident-detected terminal is connected to a countermeasure device. An operation such as increasing the log outputs of network devices (for example, an intrusion detection system [IDS]), Firewall) may be performed. These techniques make it possible to implement an efficient analysis of incidents and the construction of an environment and its operation flow in which an incident responder is able to easily monitor the communication activities (suspicious communication activities) of terminals that an attacker has the authority to operate. Hereinafter, this sort of control is collectively referred to as network control. This sort of network control makes it possible, as a result, to perform an efficient incident response that prevents reoccurrence of incidents.

In the case where, however, the above technique is applied to a large-scale network system, the problems described below occur. First, when network control is performed, there is a problem that an incident responder is likely to miss a suspicious communication activity. This is because a large number of logs and alerts are output according to the number of terminals and the communication volume of terminals. Therefore, the processing limit of the incident responder is exceeded. Moreover, if a plurality of incidents is detected simultaneously in different network segments, it is expected that the number of logs and alerts to be monitored by the incident responder will further increase. Under such circumstances, the efficiency of an incident analysis decreases. Moreover, a suspicious communication activity is easily missed.

Second, there is a problem that network control in segment units cannot fully capture internal reconnaissance activities. In general, internal reconnaissance activities may include an access to the target information of an attacker or to an authorized terminal and an access for securing a stepping-stone terminal to facilitate intrusion into a target organization again even if the internal reconnaissance activity is found once. The targets of these accesses are not limited to terminals on the same network segment. Therefore, in the network control for each network segment, a large number of groups of terminals belonging to the target network segment are control targets. As a result, it may lead to an excessive adverse effect on the business activities and mission performance of the organization. For example, it is assumed that a computer used by a person in charge of accounting work is isolated from the network and that thereby settlement processing stops and the entire business of the organization is delayed.

Therefore, it is an object of the present invention to provide a network control device and a network control method capable of performing an efficient incident response even for a large-scale network.

Solution to Problem

A network control device according to an aspect of the present invention, wherein the network control device controls a network where a plurality of terminals and countermeasure devices are present, including: a clustering unit that divides terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and a communication control setting unit that sets communication control relating to the terminals and the countermeasure devices for each of the plurality of zones.

A network control method according to an aspect of the present invention, wherein the network control method controls a network where a plurality of terminals and countermeasure devices are present, including: dividing terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and setting communication control relating to the terminals and the countermeasure devices for each of the plurality of zones.

A network control program according to an aspect of the present invention, causing a computer to perform: dividing terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and setting communication control relating to the terminals and countermeasure devices for each of the plurality of zones.

Advantageous Effects of Invention

The present invention provides an efficient incident response in a network control device.

BRIEF DESCRIPTION OF DRAWINGS

FIG. 4 It depicts an explanatory diagram illustrating an example of a list containing the settings of incident-detected terminals and the presence or absence of incident detection.

FIG. 5 It depicts an explanatory diagram illustrating an example of an internal communication history between terminals.

FIG. 6 It depicts an explanatory diagram illustrating an example of a countermeasure device setting table.

FIG. 8 It depicts an explanatory diagram illustrating an example of a control device table.

FIG. 9 It depicts an explanatory diagram illustrating an example of a control setting table.

DESCRIPTION OF EMBODIMENT

Hereinafter, exemplary embodiments of the present invention will be described with reference to appended drawings.

Exemplary Embodiment 1

Figure 1:
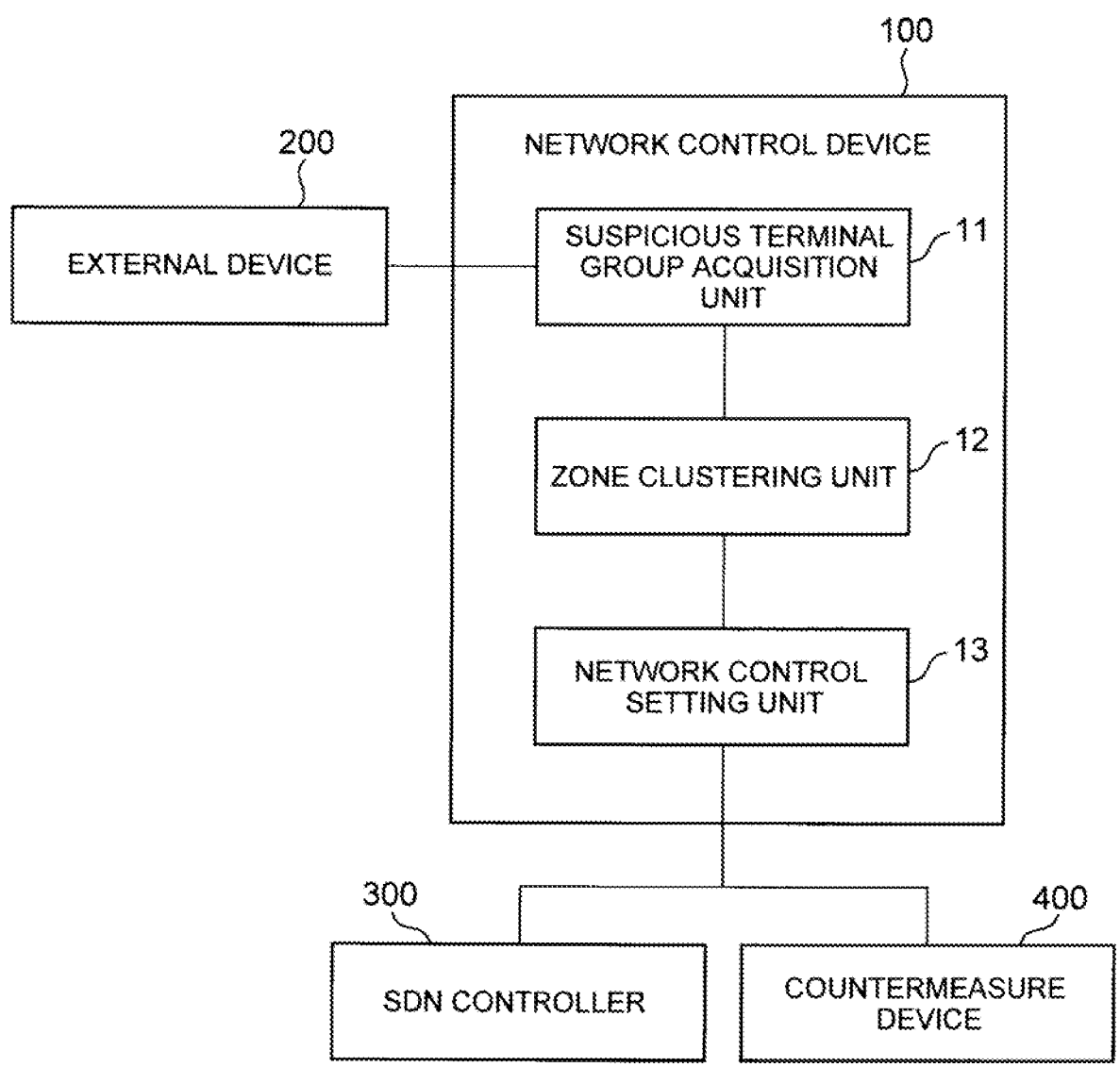
FIG. 1 It depicts a block diagram illustrating a network control device together with related devices.

FIG. 1 is a block diagram illustrating a network control device of a first exemplary embodiment together with related devices.

A network controller 100 illustrated in FIG. 1 includes a suspicious terminal group acquisition unit 11, a zone clustering unit 12, and a network control setting unit 13.

The suspicious terminal group acquisition unit 11 acquires information with which an incident-detected terminal is able to be identified, a list of related terminals suspected of being related to an incident (hereinafter, referred to as "suspicious terminal group"), and an internal communication history in the suspicious terminal group from an external device 200.

The suspicious terminal group is a group of terminals (a set of communication terminals) judged by an incident responder to be suspected of being related to an already-detected incident and to require more detailed investigation and countermeasures for incident responses (for example, a forensic investigation, an isolation from a network, or the like). For example, if the detected incident is a bot infection, the suspicious terminal group is able to be defined as a group of all the terminals that have communicated in the past with the terminal where the bot infection was confirmed. Furthermore, if the detected incident is a malware infection, an attacker may steal sensitive information or set a backdoor on a plurality of terminals by a lateral movement. Therefore, the team including the terminal where a malware infection is confirmed or all terminals in a department is able to be defined as a suspicious terminal group.

In addition, a report from an external organization may reveal that a terminal under the management network is infected with some malware. In this case, the incident response needs to be promptly performed before the type of incident is identified. Therefore, all of the terminals connected to the network segment connecting the terminal where the event was revealed may be be defined as the terminals of a suspicious terminal group.

The zone clustering unit 12 divides the incident-detected terminal and the suspicious terminal group into a plurality of zones on the basis of the information acquired by the suspicious terminal group acquisition unit 11. The network control setting unit 13 creates network control settings on the basis of an output from the zone clustering unit 12 and transmits the created network control settings to a software-defined network (SDN) controller 300. Further, the network control setting unit 13 transmits the countermeasure device action settings to a countermeasure device 400.

With this configuration, the incident responder is able to easily detect suspicious communication activities after incident detection in a large-scale network system. In other words, incident responses are thereby able to be efficiently carried out.

Figure 2:
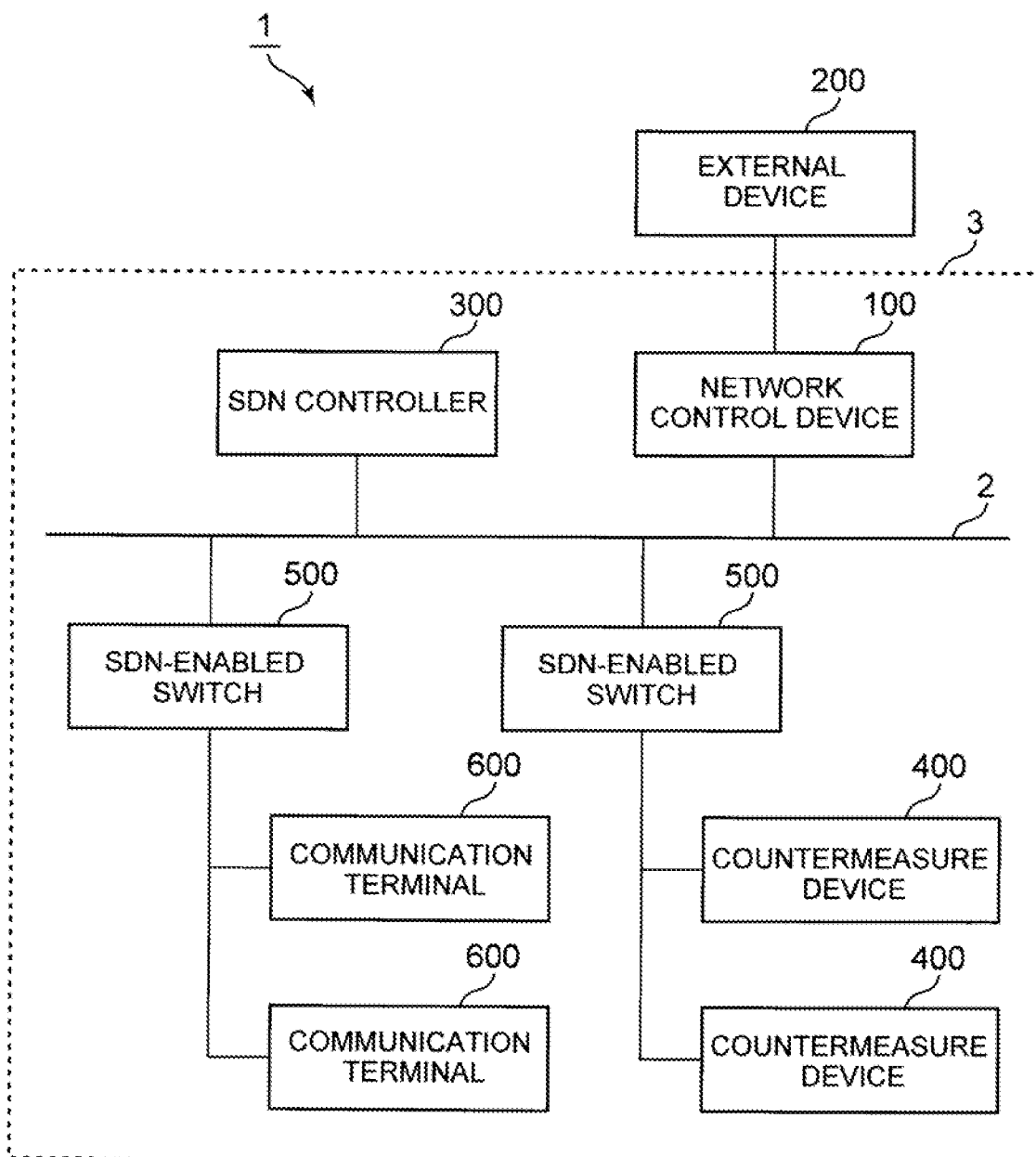
FIG. 2 It depicts a block diagram illustrating an example of a network system to which the network control device is applied.

FIG. 2 is a block diagram illustrating an example of a network system to which the network control device 100 is applied. In the example illustrated in FIG. 2, the network control device 100, the external device 200, and the SDN controller 300 are separate devices, but may be configured as a single device or any number of devices.

The network system 1 illustrated in FIG. 2 includes the network control device 100, the external device 200, the SDN controller 300, a plurality of countermeasure devices 400, a plurality of SDN-enabled switches 500, and a plurality of communication terminals 600. Although FIG. 2 illustrates two countermeasure devices 400 and two communication terminals 600, the number thereof is not limited to two. Hereinafter, the communication terminal may be simply referred to as "terminal" in some cases.

In the example illustrated in FIG. 2, the network control device 100, the SDN controller 300, and the SDN-enabled switch 500 are communicably connected to each other via a transmission line 2. The transmission line 2 may be a wired transmission line or a wireless transmission line. A network 3, which includes devices that are communicably connected via the transmission line 2, is a local network within an organization that requires incident responses, for example. The network 3, however, may be any other network.

Hereinafter, the network 3 is assumed to be an IP network. Note that the network 3 is assumed to be a network that is routed by using an SDN architecture. The network 3, however, is not limited to the SDN. For example, the network 3 may be a network that is able to be dynamically routed by some command such as a virtual local area network (VLAN) or the like.

The external device 200 is a security device that identifies a suspicious terminal group corresponding to a detected incident in the network 3. When detecting an incident occurrence, the external device 200 transmits the information of an incident-detected terminal, the list of suspicious terminal groups, and the information of internal communication between the terminals contained in the list to the network control device 100. The list of terminals transmitted by the external device 200 may be a list itself automatically extracted by the external device 200 or may be a list in which the incident responder added or deleted any terminal to or from the automatically extracted list.

The SDN controller 300 is an information processing device that has a function of changing the network flow routing of the SDN-enabled switch 500 in the network 3. Note that FIG. 2 illustrates an example in which a single SDN controller 300 is present, but there may be two or more SDN controllers 300 depending on the size of the network 3.

The countermeasure device 400 is a security device that transmits a detection result related to the incident to the network control device 100. For example, the countermeasure device 400 performs a signature detection, a behavior detection, a security policy violation detection, or a malware analysis on the basis of a network flow flowing through the transmission line 2, saved files and started processes in the communication terminal 600, registry information, executed commands, or the like. Note that these detections are merely examples, and the countermeasure device 400 may perform other detections related to the incident. Each of the plurality of counter measure devices 400 holds the settings for its own detection. Moreover, the network control device 100 may be configured so as to be able to change the settings of the detection range and detection level of the countermeasure device 400.

The SDN-enabled switch 500 is a network configuration device that has the function of determining the path information of terminals under its control according to the instructions of the SDN controller 300. Although FIG. 2 illustrates an example in which a single SDN-enabled switch 500 is present, there may be two or more SDN-enabled switches 500 depending on the size of the network 3.

The communication terminal 600 is a terminal device (hereinafter, also referred to as "terminal") that performs any communication via the transmission line 2. The communication terminal 600 is, for example, a personal computer. In addition, the communication terminal 600 may have an agent program installed therein for transmitting data in the communication terminal 600 (for example, a list of software installed in the communication terminal 600, a list of boot processes, any information log) to any countermeasure device 400.

Figure 3:
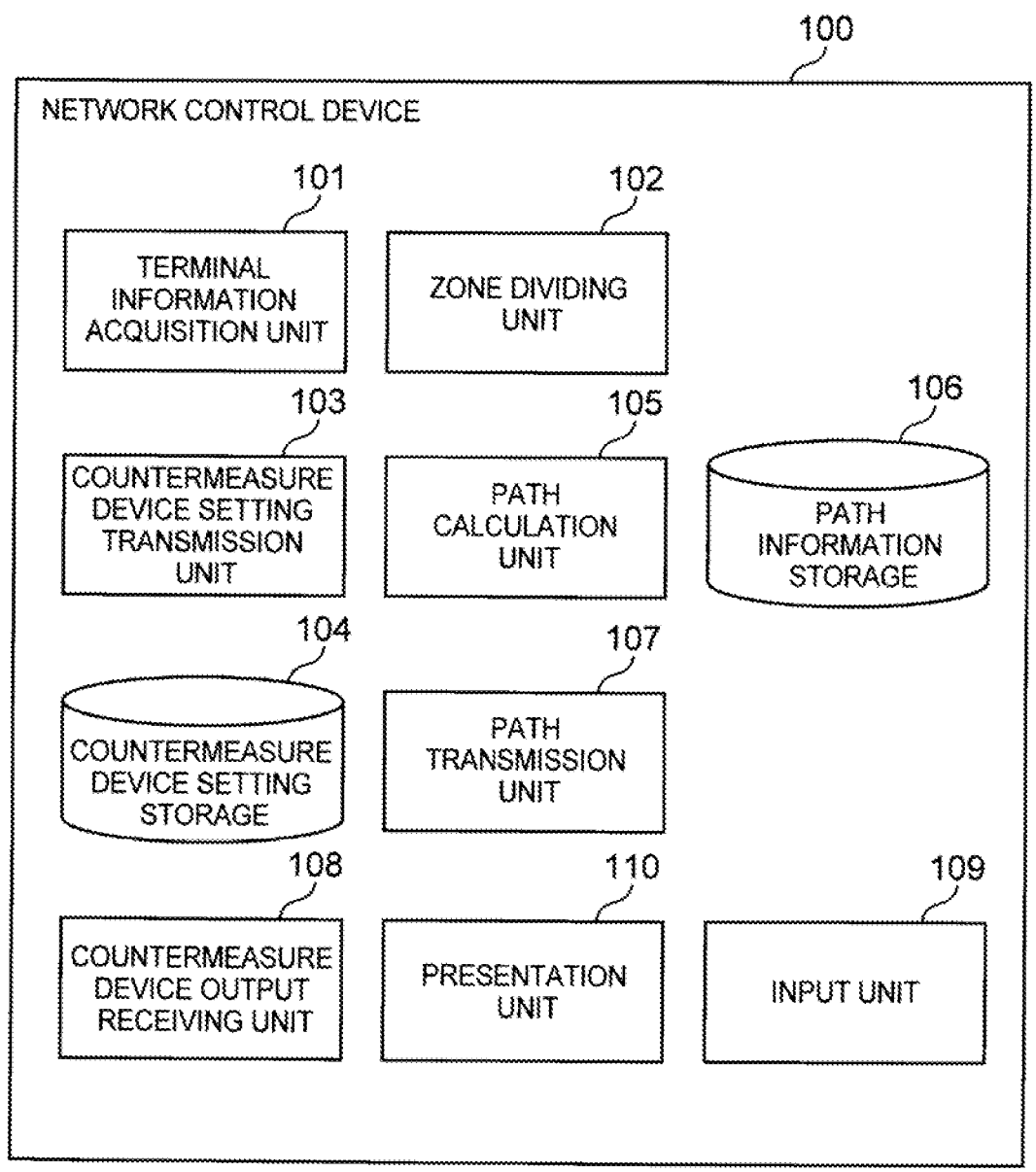
FIG. 3 It depicts a functional block diagram illustrating functional blocks in a network control device of a first exemplary embodiment.

Subsequently, the components of the network control device 100 will be described with reference to FIGS. 2 and 3. FIG. 3 is a functional block diagram illustrating functional blocks in the network control device 100.

As described above, the network control device 100 is a network control device that divides a terminal group suspected of being related to an incident into zones, changes the communication path and communication range for each zone, and further changes the settings of the countermeasure device 400. The network control device 100 may be implemented by a dedicated analysis device or a general-purpose device such as a personal computer.

In the example illustrated in FIG. 3, the network control device 100 includes a terminal information acquisition unit 101, a zone dividing unit 102, a countermeasure device setting transmission unit 103, a countermeasure device setting storage 104, a path calculation unit 105, a path information storage 106, a path transmission unit 107, a countermeasure device output receiving unit 108, an input unit 109, and a presentation unit 110.

In comparison with each block in the network control device 100 illustrated in FIG. 1, the function of the terminal information acquisition unit 101 corresponds to the function of the suspicious terminal group acquisition unit 11. The function of the zone dividing unit 102 corresponds to the function of the zone clustering unit 12. The functions of the countermeasure device setting transmission unit 103, the countermeasure device setting storage 104, the path calculation unit 105, the path information storage 106, and the path transmission unit 107 correspond to the function of the network control setting unit 13.

Note that the way of dividing the functional blocks illustrated in FIG. 3 is merely an example, and other ways of dividing the functional blocks may be used under the condition that the processing in the exemplary embodiment can be achieved.

The terminal information acquisition unit 101 acquires terminal information including information with which an incident-detected terminal is able to be identified, information with which a related terminal group suspected of being related to an incident is able to be identified among the plurality of communication terminals 600, and an inter-terminal communication history from the external device 200. The terminal information acquisition unit 101 outputs the terminal information to the zone dividing unit 102.

FIG. 4 is an explanatory diagram illustrating an example of a list containing the settings of incident-detected terminals and the presence or absence of incident detection. FIG. 4 illustrates a table listing the identifiers of terminals suspected of being related to an incident, with the terminal identifiers as internet protocol (IP) addresses, and data indicating the presence or absence of incident detection.

FIG. 5 is an explanatory diagram illustrating an example of an internal communication history between terminals. FIG. 5 illustrates a table representing an inter-terminal communication history by pairing the terminal identifiers of a source and the terminal identifiers of a destination with the terminal identifiers as IP addresses.

The terminal information that the terminal information acquisition unit 101 receives from the external device 200 is not limited to the information with which an incident-detected terminal is able to be identified, the list of suspicious terminals, and the internal communication history between terminals included in the list. The terminal information acquisition unit 101 may receive a list of processes running on each terminal, a communication volume list of the terminals, or the like, for example.

The zone dividing unit 102 creates a graph (communication graph) with nodes corresponding to terminals and edges corresponding to the presence or absence of internal communication on the basis of the information output from the terminal information acquisition unit 101 and the information input to the input unit 109. Furthermore, the zone dividing unit 102 determines a combination of a terminal and a zone. The zone dividing unit 102 determines the combination by applying clustering processing such as community clustering to the communication graph. Then, the zone dividing unit 102 outputs the information with which terminals suspected of being related to an incident and a list of zones including the terminals to the countermeasure device setting transmission unit 103 and the path calculation unit 105.

The countermeasure device setting transmission unit 103 outputs an instruction of changing the settings for each zone created by the zone dividing unit 102 on the basis of the settings of the countermeasure device setting storage 104 to the counter measure device 400.

The countermeasure device setting storage 104 holds information related to action settings according to the type of a countermeasure device and a zone. The related sets of information are the identifier of each countermeasure device 400, the name, the zone type, and the setting method, for example.

FIG. 6 is an explanatory diagram illustrating an example of a countermeasure device setting table held in the countermeasure device setting storage 104. In the example illustrated in FIG. 6, the countermeasure device settings are classified into five categories: "countermeasure device identifier," "name," "IP," "settings profile," "application programming interface (API) type," and "zone." In other words, the countermeasure device setting storage 104 holds the settings profile and setting method of each countermeasure device for terminals included in a certain zone.

The path calculation unit 105 calculates the communication path and communication range of the terminals allocated to respective zones, on the basis of the output of the zone dividing unit 102, the information held in the path information storage 106, and the information input to the input unit 109.

The communication path and communication range in this exemplary embodiment will be described. Here, the case where two zones (zone A and zone B) are obtained by the zone dividing unit 102 is taken as an example.

Figure 7:
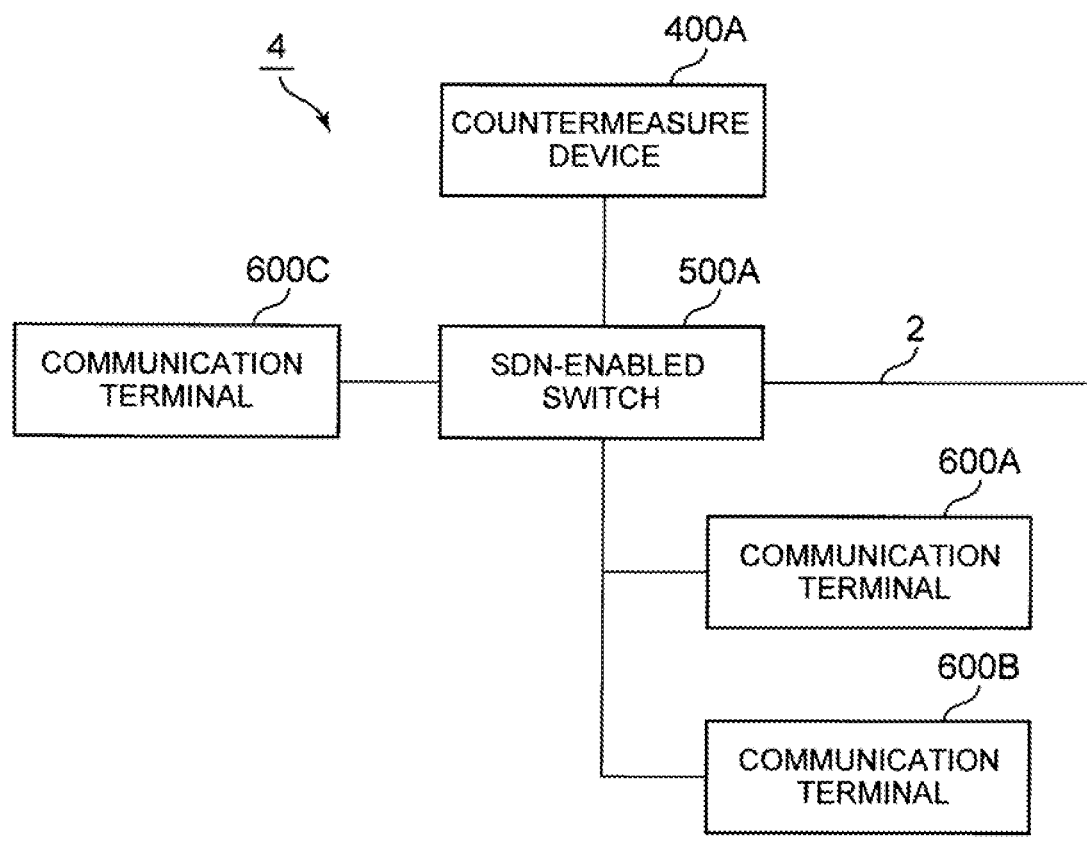
FIG. 7 It depicts a block diagram illustrating an example of a subnetwork composed of a part of a device group in the network.

FIG. 7 is a block diagram illustrating an example of a subnetwork 4 composed of a part of the device group in the network 3. In the example illustrated in FIG. 7, communication terminals 600A, 600B, and 600C are connected to the counter measure device 400A via an SDN-enabled switch 500A in the subnetwork 4.

For example, suppose the communication terminal 600A tries to communicate with the communication terminal 600C. When the communication terminal 600A is classified as, for example, zone A, a communication packet output from the communication terminal 600A reaches the communication terminal 600C via the SDN-enabled switch 500A. This action is similar to that of a general computer network.

When the communication terminal 600A is classified as, for example, zone B, a communication packet output from the communication terminal 600A is transmitted to the counter measure device 400A via the SDN-enabled switch 500A, and a communication packet output from the countermeasure device 400A reaches the communication terminal 600C, which is the final communication destination, via the SDN-enabled switch 500A.

Thus, the path where the communication packet itself regarding a terminal assigned to a specific zone goes through may be changed from the normal path or the communication packet may be transmitted to the countermeasure device 400A by mirroring in some cases. The path where the communication packet goes through is referred to as "communication path."

As another example, suppose the communication terminal 600A tries to communicate with the communication terminals 600B and 600C. In FIG. 7, when the communication terminal 600A is classified as, for example, zone A, a communication packet output from the communication terminal 600A reaches the communication terminal 600B and the communication terminal 600C via the SDN-enabled switch 500A.

When the communication terminal 600A is classified as, for example, zone B, a communication packet to the communication terminal 600B reaches the communication terminal 600B via the SDN-enabled switch 500A, but there are cases where a communication packet to the communication terminal 600C is discarded at the SDN-enabled switch 500A.

Thus, there are cases where the communication packet for a terminal assigned to a specific zone is discarded at the specific SDN-enabled switch. The reachable range in the network 3 of the communication packet output from the terminal assigned to the specific zone is referred to as "communication range."

The path calculation unit 105 writes information including the terminal identifier corresponding to the calculated communication path and communication range and the zone corresponding to the terminal into the path information storage 106.

The path information storage 106 stores the identifiers of the SDN-enabled switches 500 to which the SDN controller 300 is able to instruct, the range of network segments managed by each switch, the identifiers of terminals in which network control is performed, zones set to the terminals, and the communication control settings that have been set.

FIG. 8 is an explanatory diagram illustrating an example of information (control device table) stored in the path information storage 106. In the example illustrated in FIG. 8, a set of the control device information set in the control device table is "SDN switch identifier" and "target segment." In other words, the range of the network segment managed by each switch is set in the control device table.

FIG. 9 is an explanatory diagram illustrating an example of path information stored in the path information storage 106. In the example illustrated in FIG. 9, the following four items are set as path information in the control setting table: "terminal identifier," "zone," "SDN switch identifier," and "communication control settings." Thus, the control setting table contains the settings of information with which a terminal is able to be identified ("terminal identifier"), information with which the zone assigned to the terminal is able to be identified ("zone"), communication control settings that are applied to the terminal when the zone is allocated to the terminal belonging to a network segment, and the identifier of a switch that performs the control settings ("SDN switch identifier").

The communication control setting means a settings of communication path and a communication range. There is an example of the communication control setting (for example, communication control setting C1) that a certain terminal is not permitted to communicate with, for example, an external network, while permitted to communicate with other internal networks. There is another example of the setting (for example, communication control setting C2) that a certain terminal is not permitted to communicate with a specific network segment, while permitted to communicate with an external Internet and to other internal networks. There is still another example of the setting that a certain terminal is permitted to communicate, though a communication packet is intervened between the terminal and a specific countermeasure device. Note that the specific communication control settings are not limited thereto and other settings may be used.

In addition, the path calculation unit 105 is able to add or delete any row in the control device table and the control setting table.

The countermeasure device output receiving unit 108 receives an output from the countermeasure device 400 and then outputs it to the presentation unit 110.

The input unit 109 receives an operation input from an incident responder and outputs the input information to the zone dividing unit 102, the path transmission unit 107, and the presentation unit 110.

The presentation unit 110 includes a display device or is configured to transmit data for display to the display device. The presentation unit 110 receives information from the path transmission unit 107, the countermeasure device output receiving unit 108, and the input unit 109 and then performs control to present the information to the incident responder. Hereinafter, what the presentation unit 110 performs control for presenting the information is sometimes expressed as the presentation unit 110 displays the information or the presentation unit 110 presents the information.

Figure 10:
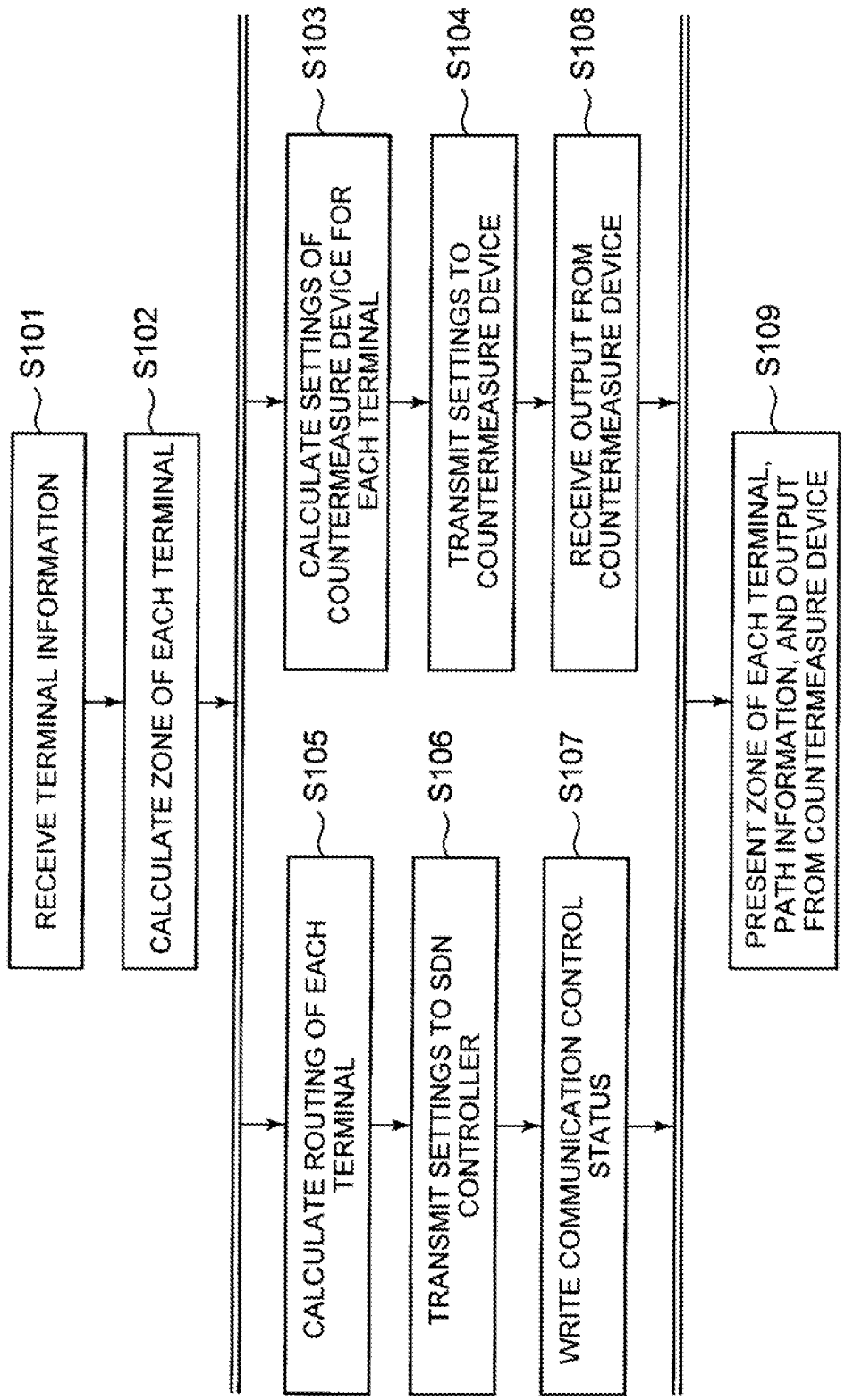
FIG. 10 It depicts a flowchart illustrating network control processing.
Figure 11:
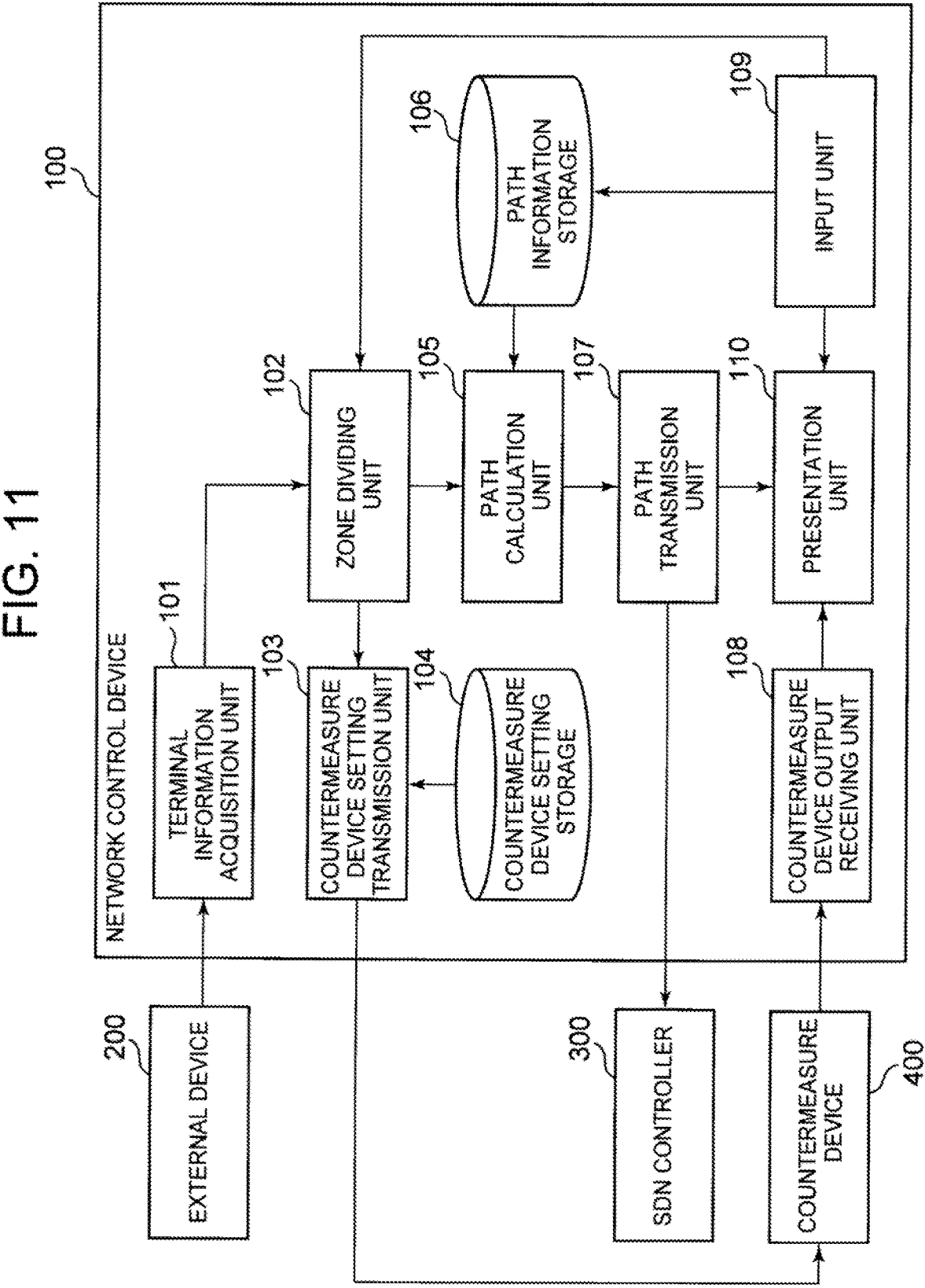
FIG. 11 It depicts a functional block diagram illustrating the flow of processing in the respective blocks included in the network control device of the first exemplary embodiment.

Next, the network control is described with reference to the flowchart in FIG. 10 and the block diagram in FIG. 11. FIG. 10 is a flowchart illustrating network control processing. FIG. 11 is a functional block diagram illustrating the flow of processing in the respective blocks included in the network control device 100.

The following description will be made by giving an example of a case of detecting an incident-detected terminal (the terminal with "192.168.2.8") as illustrated in FIG. 4. In addition, a case where path information is set in the control setting table, as illustrated in FIG. 9, is taken as an example.

As illustrated in FIG. 10, when the terminal information acquisition unit 101 receives an output from the external device 200 (step S101), the network control device 100 starts a calculation process. The calculation process of the network control device 100 is as described below.

The zone dividing unit 102 uses the information received by the terminal information acquisition unit 101 to calculate a zone to which each terminal belongs (step S102). The zone dividing unit 102 creates an undirected or directed graph with the terminals (IP addresses) as nodes and with the communication path between the terminals as an undirected edge or a directed edge. Next, the zone dividing unit 102 divides the terminals included in the created graph into a plurality of communities by using a community clustering algorithm or other algorithms on the basis of the structure of the created graph.

The zone dividing unit 102 defines a plurality of zones by, for example, defining a community including incident-detected terminals as a zone with zone number "1" (zone 1: first zone) and a community including other terminals as a zone with zone number "2" (zone 2: second zone) and by assigning terminals not included in the graph to a zone with zone number "3" (zone 3: third zone), or the like. Note that at least one communication terminal belongs to each zone.

The zone dividing unit 102 outputs a list including terminal identifiers and zone numbers to which respective terminals belong, as a calculation result, to the countermeasure device setting transmission unit 103 and to the path calculation unit 105 (see FIG. 11). In addition, the zone dividing unit 102 outputs the created graph to the presentation unit 110 (see FIG. 11).

A list including the terminal identifiers and the zone numbers to which respective terminals belong includes information, for example, that a terminal with an identifier "192.168.2.8" belongs to a zone with the zone number "1," a terminal with an identifier "192.168.1.21" belongs to a zone with the zone number "2," and the like.

Figure 12:
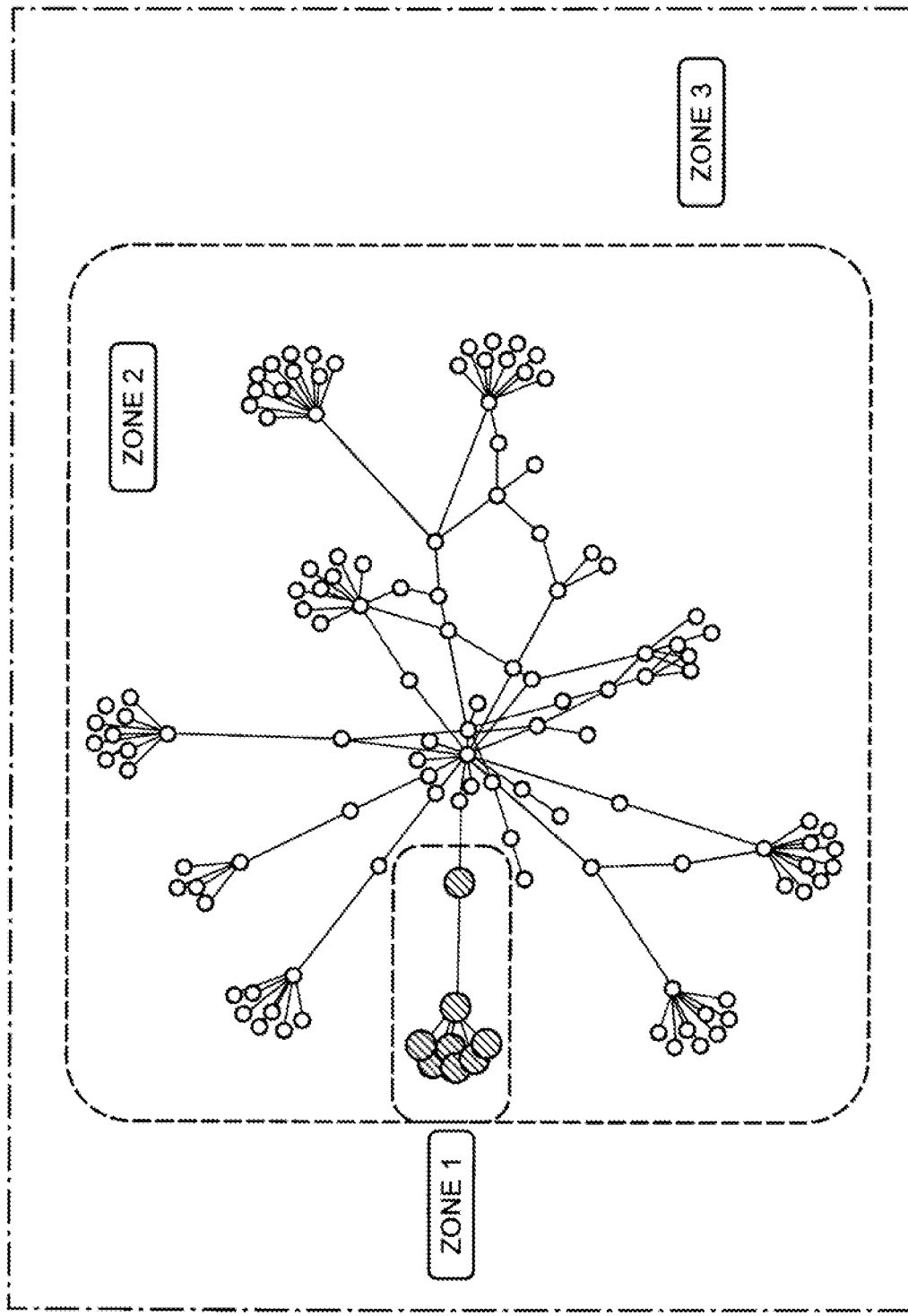
FIG. 12 It depicts an explanatory diagram illustrating an example of a graph created by a zone dividing unit.

FIG. 12 is an explanatory diagram illustrating an example of a graph created by the zone dividing unit 102. FIG. 12 illustrates a result of performing the community clustering by using the Girvan-Newman algorithm (see NPL 5) on a graph created with terminals as nodes and communication paths between terminals as edges.

In FIG. 12, the first to third zones are defined by performing attaching the terminals belonging to the same community as it belonging to the incident-detected terminal (nodes drawn larger than other nodes in FIG. 12) to the first zone, attaching other nodes to the second zone, and attaching terminals not included in the graph (in other words, terminals not suspected of being related to an incident) to the third zone. Although the terminal group is divided into three zones in this example, it may be divided into two zones or four or more any number of zones.

For example, in the case where the terminal group is divided into k zones, the terminal group belonging to the same community as it belonging to the incident-detected terminal is defined as the first zone in the graph in which the terminal group is divided into a plurality of communities by using the Girvan-Newman algorithm as illustrated in FIG. 12, and thereafter a group of terminals that belong to the same community as it belonging to a terminal concerned is able to be defined as a zone in descending order of betweenness centrality of terminals (refer to NPL 6) in the graph. Note that terminals that have already been classified as any one of the zones are not subject to zoning. As a method of defining k zones, when (k−2) zones have been defined, terminals included in the graph but not yet belonging to any of the zones may be classified as the (k−1)-th zone and then terminals not included in the graph may be defined to belong to the k-th zone.

Note that the method of defining zones as described above is merely an example, and other methods may be used.

The presentation unit 110 displays the graph as illustrated in FIG. 12 and the list of terminals included in each zone on the screen of the display device.

The countermeasure device setting transmission unit 103 determines information (the setting of the counter measure device 400 for each communication terminal 600) that is to be transmitted to the countermeasure device 400 on the basis of the output of the zone dividing unit 102 and the information stored in the countermeasure device setting storage 104 (step S103). Then, the countermeasure device setting transmission unit 103 transmits the determined settings to the counter measure device 400 (step S104). The countermeasure device setting storage 104 has stored the settings profile corresponding to a combination of each countermeasure device 400 and a zone number. The countermeasure device setting transmission unit 103 is able to find a profile that each countermeasure device 400 sets for a specific terminal by combining the output from the zone dividing unit 102 with the settings profile.

Note that there is a countermeasure device whose settings can be changed by using an application programmable interface (API) prepared by a vendor of the countermeasure device. Furthermore, in some cases, the device settings can be performed according to OpenC2 or other standards. Taking these into consideration, the desired setting standard is related to each countermeasure device 400 as "API Type," thereby enabling change in the settings of the device regardless of the type of the countermeasure device 400.

For example, taking "App1" in FIG. 6 as an example, with respect to the counter measure device 400 having the countermeasure device identifier "App1," the "OpenC2" standard information is used to transmit an instruction of applying the settings of a setting profile "P01" for a terminal with "192.168.2.8" and an instruction of applying the settings of a setting profile "P02" for a terminal with "192.168.1.21" to an App1 address "192.168.0.65."

The countermeasure device 400 changes the device settings on the basis of the information from the countermeasure device setting transmission unit 103 (see FIG. 11).

Thereafter, the countermeasure device 400 transmits an output log to the countermeasure device output receiving unit 108 (step S108) as illustrated in FIG. 11. With respect to the countermeasure device 400 that cannot transmit the output by itself, the countermeasure device output receiving unit 108 may attempt to access to the countermeasure device 400 at regular intervals to acquire the output log.

In addition, the path calculation unit 105 calculates the communication path and communication range by combining the information stored in the path information storage 106 for the terminals included in the output of the zone dividing unit 102 (step S105). The path calculation unit 105 outputs a calculation result (settings) to the path transmission unit 107 (see FIG. 11).

The path transmission unit 107 transmits the settings obtained from the path calculation unit 105 to the SDN controller 300 (step S106). In addition, the path transmission unit 107 writes the current network control status into the path information storage 106 (step S107). The path information storage 106 stores the latest path control information for each terminal.

The path information storage 106 stores the records of the identifiers of the SDN-enabled switches 500 controllable by the SDN controller 300 and network segment ranges took care of by respective switches. Thus, the identifiers and zone numbers of the terminals under the network control, the network control settings, and the identifiers of the SDN switches in charge are stored in the path information storage 106, by which the current network control status is managed.

For example, in the example illustrated in FIG. 8 and FIG. 9, the zone number assigned to the terminal identifier "192.168.1.21" is "1" and the controlled SDN switch identifier is "sw01," therefore the communication range is a network control setting "C01."

Figure 13:
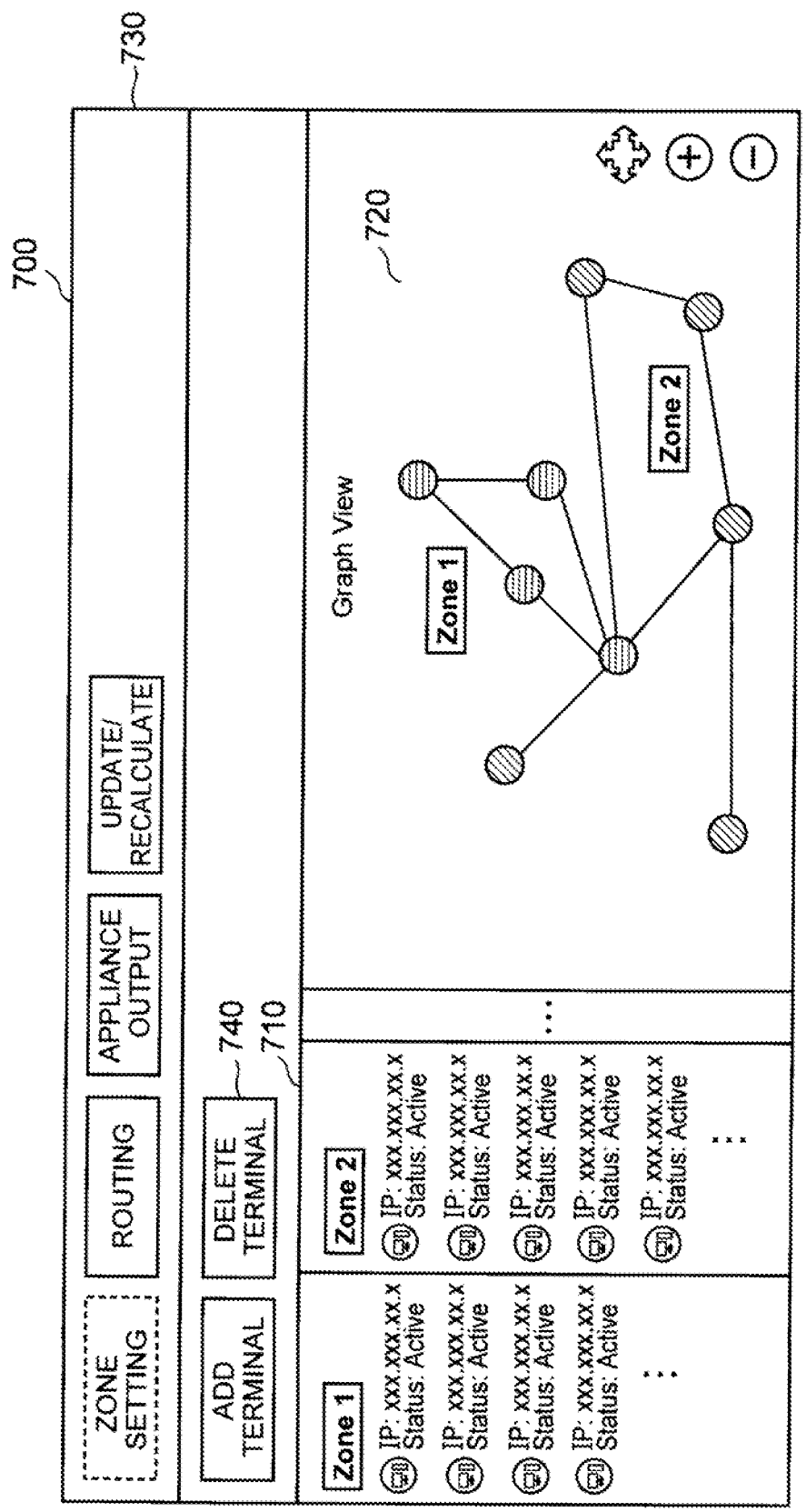
FIG. 13 It depicts an explanatory diagram illustrating an example of GUI displayed by a presentation unit.
Figure 14:
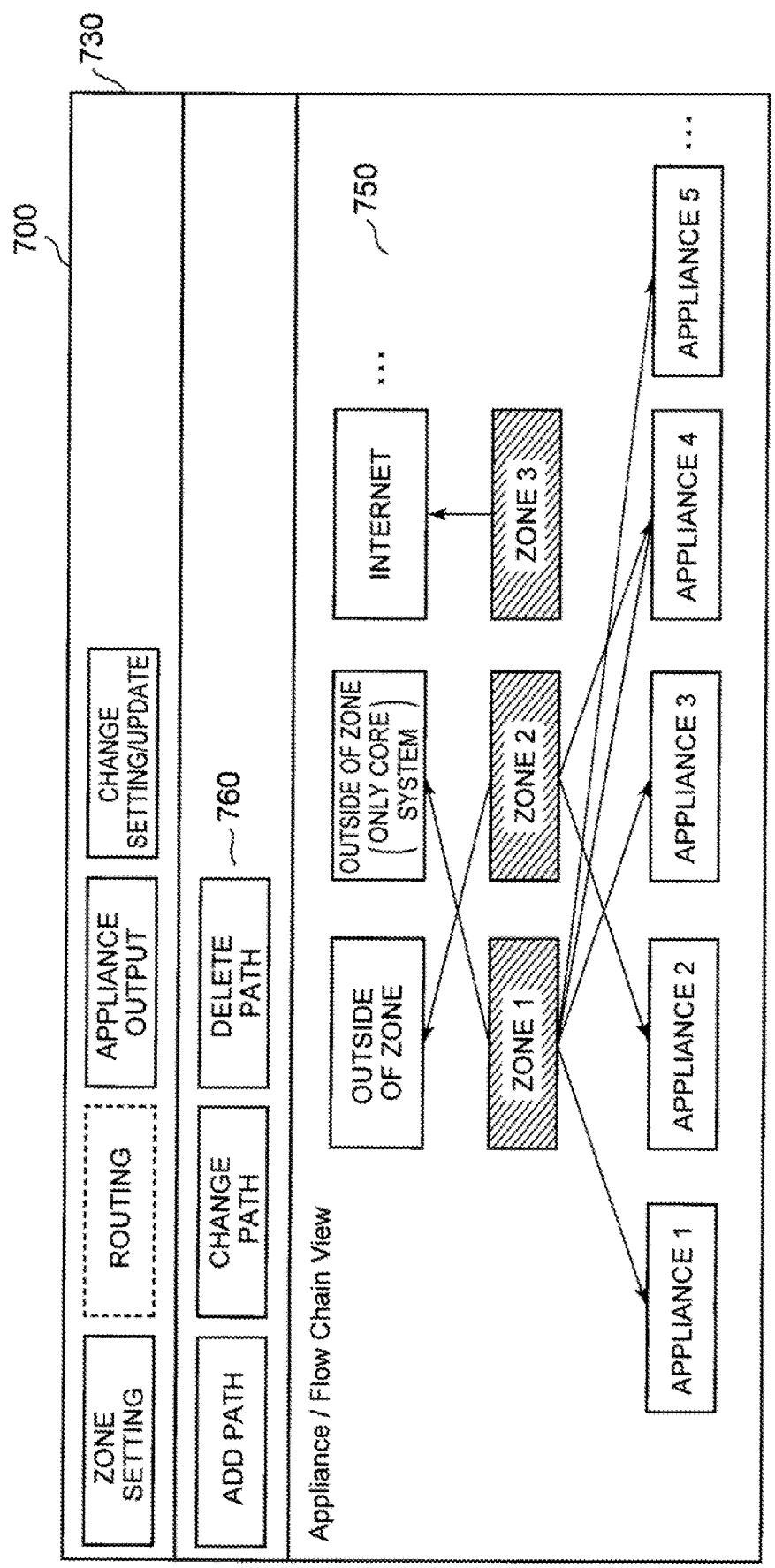
FIG. 14 It depicts an explanatory diagram illustrating another example of GUI displayed by the presentation unit.
Figure 15:
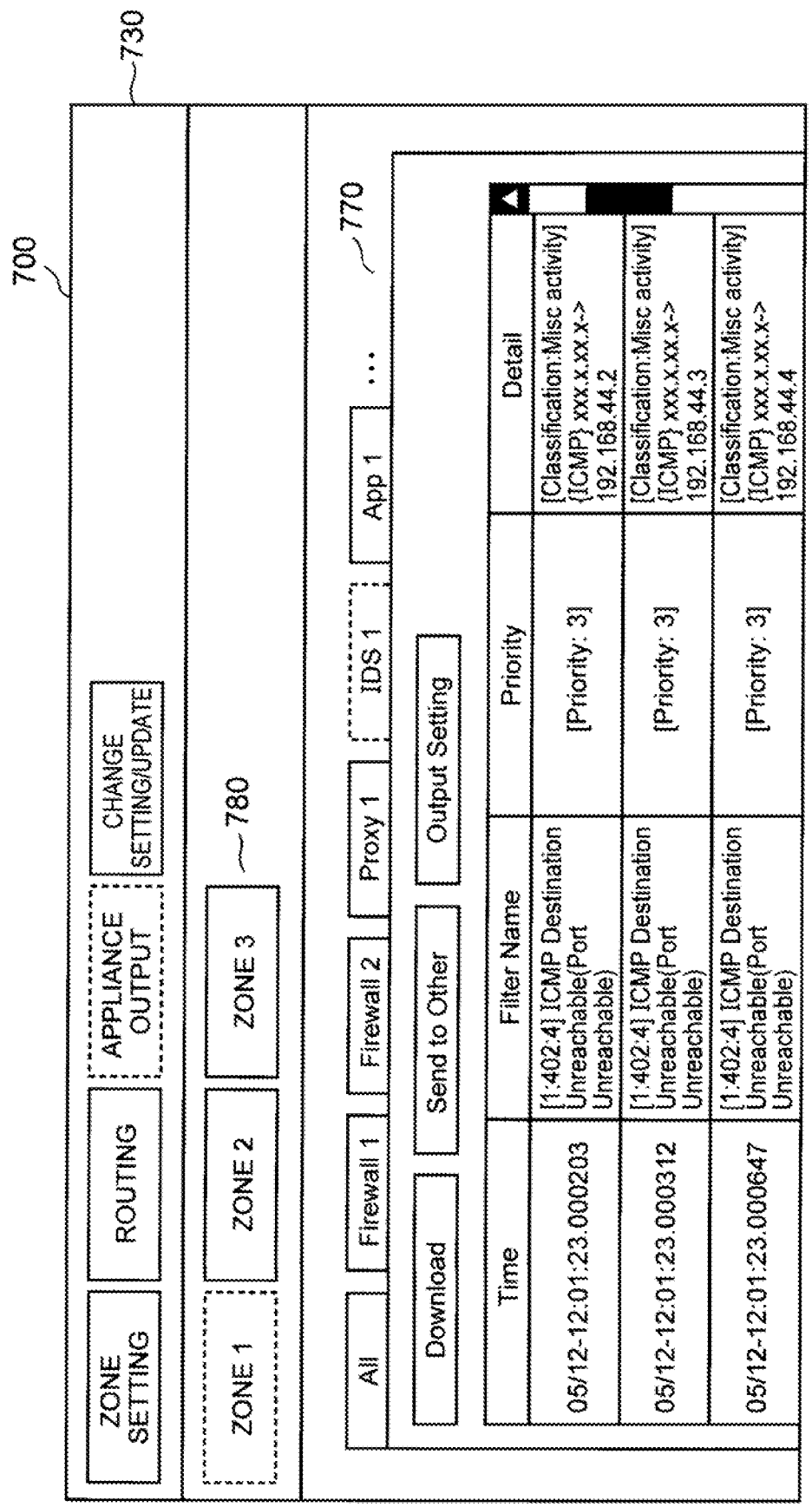
FIG. 15 It depicts is an explanatory diagram illustrating still another example of GUI displayed by the presentation unit.

The presentation unit 110 finally displays (presents) the results on the basis of the outputs of the zone dividing unit 102, the countermeasure device setting transmission unit 103, the path transmission unit 107, the countermeasure device output receiving unit 108, and the input unit 109 (step S109). FIGS. 13, 14 and 15 illustrate concrete examples of a graphical user interface (GUI) displayed by the presentation unit 110.

In the example illustrated in FIG. 13, the presentation unit 110 displays a state view 700 on the screen. The presentation unit 110 displays, for example, a zone terminal list display area 710 on the left side and a graph display (graph view) area 720 on the right side in the state view 700. The presentation unit 110 displays information on terminals (communication terminals) included in each zone in the zone terminal list display area 710. The presentation unit 110 displays, for example, IP addresses and states (active or the like) as information of respective terminals.

The presentation unit 110 displays a directed or undirected graph in the graph display area 720 with nodes as terminals and edges as internal communication history. As the graph to be displayed, for example, an undirected graph drawn with the color and pattern different for each zone is displayed. Furthermore, the presentation unit 110 displays a main menu 730 at the top in the state view 700. The presentation unit 110 displays various buttons necessary for operating the presentation unit 110 in the main menu 730. In addition, the presentation unit 110 displays the "Add/Delete terminal" button 740 below the main menu 730. The "Add/Delete terminal" button 740 is a button for an analyst (incident responder) to add or delete any terminal as a node of the graph and zone terminal list.

In the example illustrated in FIG. 14, the presentation unit 110 displays a path view 750 when the routing button of the main menu 730 is selected. The path view 750 allows the analyst to confirm the communication path and communication range of each zone and the settings of the countermeasure device. FIG. 14 illustrates an example of the display on the path view 750 in which blocks are arranged vertically in three rows including: the communication ranges displayed in the upper row; the zone numbers displayed in the middle row; and the countermeasure devices displayed in the lower row. By connecting arrows from the middle block to the upper and lower blocks, the analyst is able to easily see the current routing. Further, the presentation unit 110 displays a routing menu 760 above the path view 750. The routing menu 760 includes Add path, Change path, and Delete path buttons, for example. The analyst is able to add, change, or delete an arrow to a communication range and to a countermeasure device from any zone in the path view 750.

In the example illustrated in FIG. 15, the presentation unit 110 displays an appliance output view 770 when an appliance output button in the main menu 730 is selected. The analyst is able to confirm the logs and alarms output from various countermeasure devices in a list format.

FIG. 15 illustrates an example in which a tab for each countermeasure device is displayed. The analyst is able to scroll and check the output such as logs, alerts, or the like and to download the output to the local terminal of the analyst in an arbitrary format. Furthermore, the presentation unit 110 displays a zone selection menu 780 above the appliance output view 770. The zone selection menu 780 contains buttons corresponding to respective zone numbers. When each button is selected, the presentation unit 110 displays the output of the countermeasure device, which is related to the corresponding zone in the path view 750, on the appliance output view 770.

In the network control device 100 of the exemplary embodiment, the zone dividing unit 102 divides a terminal group suspected of being related to an incident into a plurality of zones, and the countermeasure device setting transmission unit 103 and the path calculation unit 105 are able to set the communication path and communication range and the appliance output different for each terminal included in the zone.

Therefore, the incident responder is able to perform monitoring with prioritization for each zone regarding the monitoring of a large number of terminals suspected of being related to an incident by using the network control device 100 of this exemplary embodiment. As a result, the number of logs and alerts that require special attention is reduced, and the incident responder is able to notice suspicious activities of attackers more easily. This enables the incident responder to curb the incident efficiently.

What each zone is prioritized means that, for example, in the operation of the organization that carries out security monitoring, strict monitoring is performed by setting to output more logs and alerts of the countermeasure device as a zone number becomes smaller, and by setting to output minimum number of alerts in a zone having a large zone number. In other words, it means that changes in monitoring obligations according to security risks are set for each zone.

The example of the background art is a method of changing the communication path or changing the setting of security appliance for terminals of a specific network segment or for all terminals that violated a certain rule. In comparison with that method, when the network control device 100 of this exemplary embodiment is used, the incident responder is able to perform the processes of changing the communication path and changing the setting of security appliance for a limited terminal group suspected of being related to an incident. Therefore, the incident responder is able to perform an incident response without excessively affecting the network of the organization or the accomplishment of a mission of the organization.

Exemplary Embodiment 2

Figure 16:
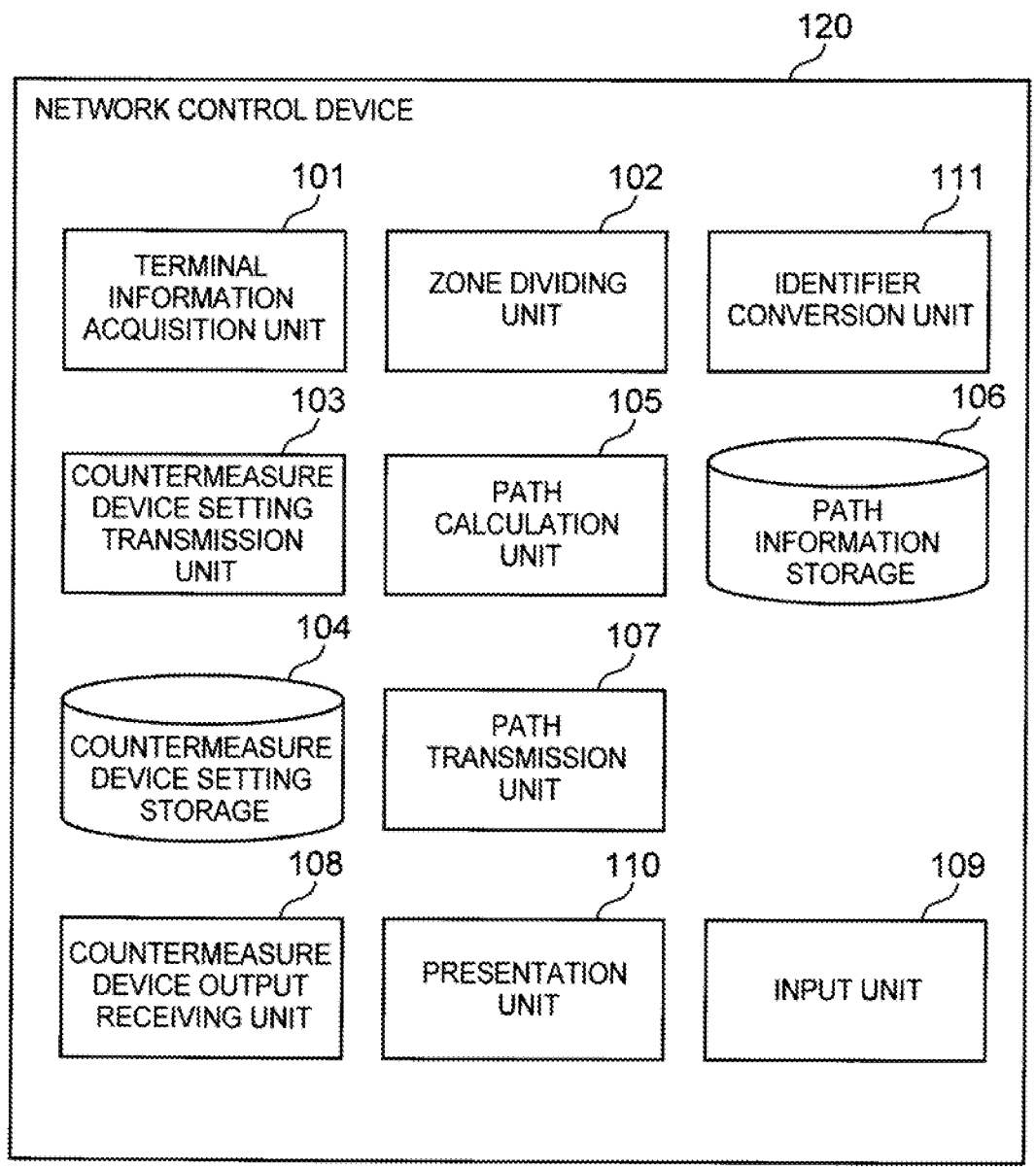
FIG. 16 It depicts a functional block diagram illustrating functional blocks in a network control device of a second exemplary embodiment.

FIG. 16 is a functional block diagram illustrating functional blocks in a network control device 120 of a second exemplary embodiment. As illustrated in FIG. 16, the network control device 120 of the second exemplary embodiment has a configuration in which an identifier conversion unit 111 is added to the network control device 100 of the first exemplary embodiment. The components other than the identifier conversion unit 111 are the same as the components in the network control device 100 of the first exemplary embodiment illustrated in FIG. 3.

Note that an example of the use condition of the network control device of the second exemplary embodiment is similar to the use condition of the first exemplary embodiment illustrated in FIG. 1. An example of a network system to which the network control device 120 is applied is the same as the network system illustrated in FIG. 2.

Unless the terminal identifiers output from the zone dividing unit 102 are IP addresses, the identifier conversion unit 111 converts each terminal identifier to the corresponding IP address. The identifier conversion unit 111 then transmits the IP address to the path information storage 106.

Figure 17:
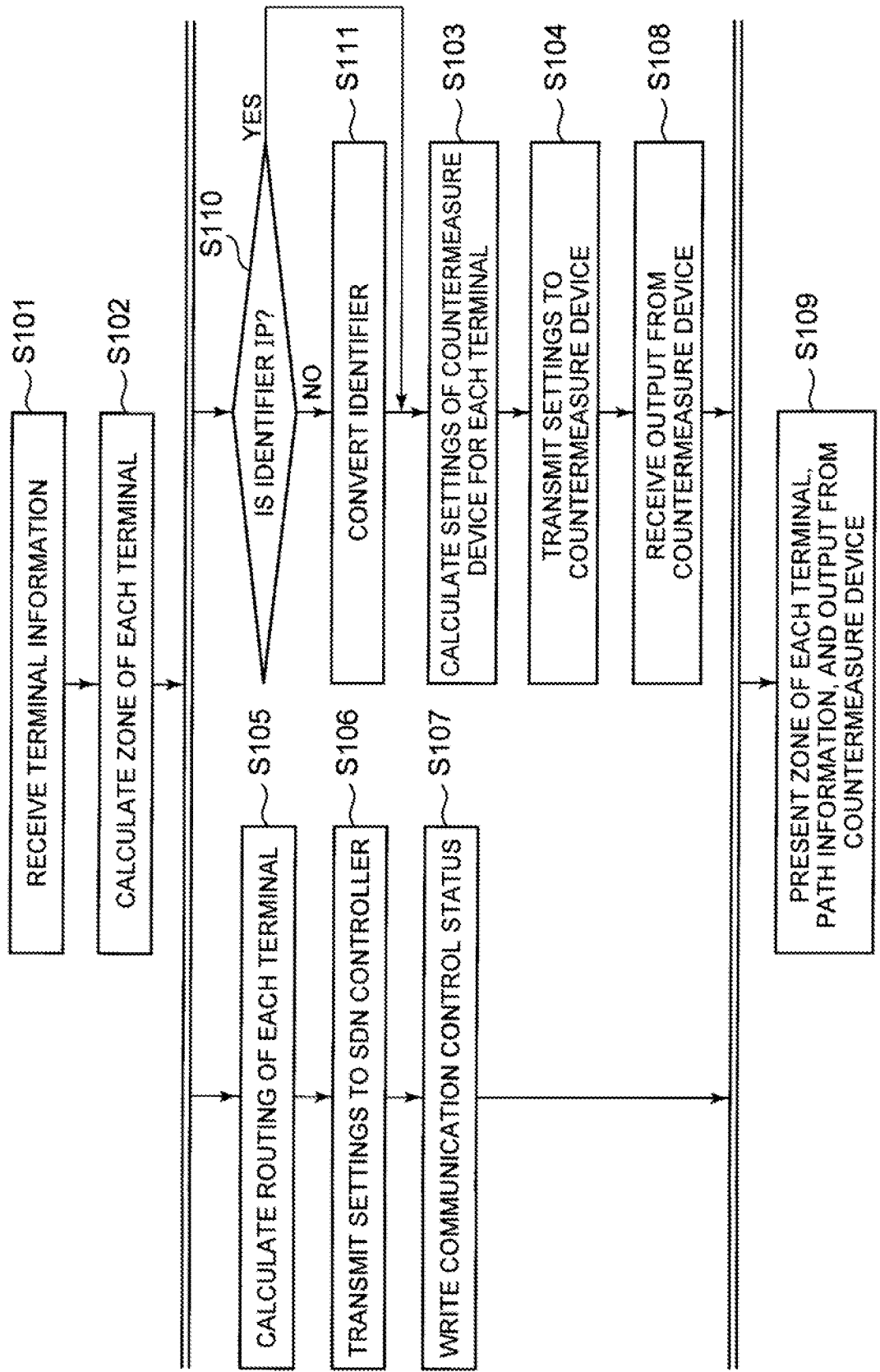
FIG. 17 It depicts a flowchart illustrating network control processing.
Figure 18:
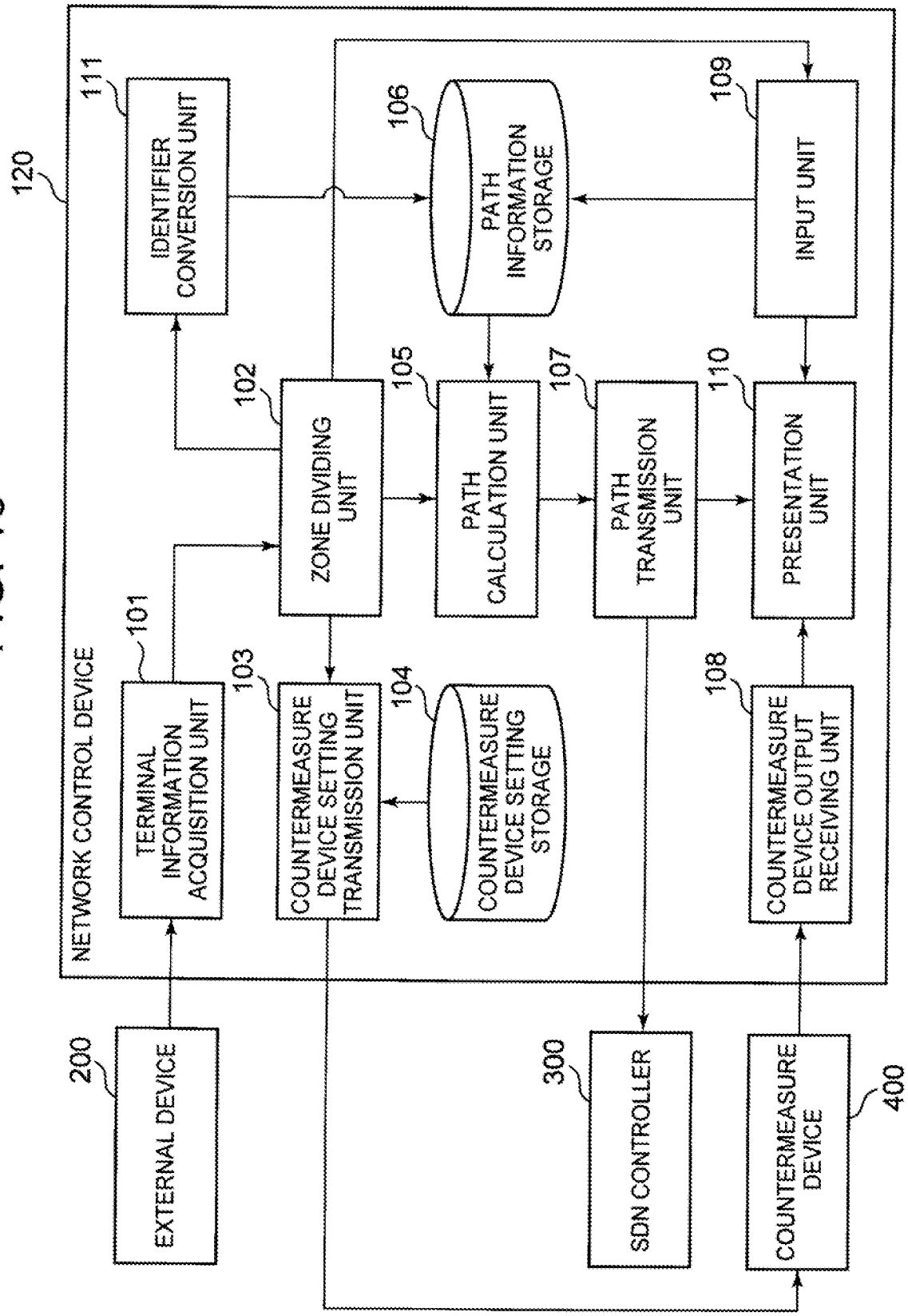
FIG. 18 It depicts a functional block diagram illustrating the flow of processing in the respective blocks included in the network control device of the second exemplary embodiment.

Next, the network control in the second exemplary embodiment will be described with reference to the flowchart of FIG. 17 and the block diagram of FIG. 18. FIG. 17 is a flowchart illustrating network control processing. FIG. 18 is a functional block diagram illustrating the flow of processing in the respective blocks included in the network control device 120.

Note that, in the flowchart of FIG. 17, the same processes as those of the network control illustrated in FIG. 10 are denoted by the same reference numerals as those in FIG. 10. In addition, the components other than the identifier conversion unit 111 in FIG. 18 are the same as the components in the network control device 100 of the first exemplary embodiment illustrated in FIG. 11.

In the second exemplary embodiment, unless the terminal identifiers included in the output of the zone dividing unit 102 is an IP, the identifier conversion unit 111 converts each terminal identifier to the IP address corresponding to the terminal identifier (steps S110 and S111). The identifier conversion unit 111 then outputs the IP address to the path information storage 106. The path information storage 106 is able to identify the SDN-enabled switch 500 corresponding to each terminal identifier on the basis of the output of the identifier conversion unit 111. Other processes are the same as those in the network control of the first exemplary embodiment.

In this exemplary embodiment, the effect of the function of the identifier conversion unit 111 is able to be acquired in addition to the effect owing to the first exemplary embodiment. Specifically, even if the terminal identifier included in the output of the external device 200 is not an IP address, but, for example, the media access control (MAC) address of the terminal, the identification (ID) of the user who uses it, the terminal serial number, or the like, the path information storage 106 is able to acquire an advantageous effect that the terminal identifier and the SDN-enabled switch 500 can be associated with each other.

Although each component in the above exemplary embodiments may be composed of a piece of hardware, it also may be composed of a piece of software. Moreover, each component may be composed of multiple hardware or of multiple software. Some of the components may be composed of hardware with others thereof composed of software.

Each function (each process) in the above exemplary embodiments is able to be implemented by a computer having a processor such as a central processing unit (CPU) and a memory and the like. For example, a storage device (storage medium) may be used to store a program for performing the method (processing) in the above exemplary embodiments, so that the CPU executes the program stored in the storage device to implement each function.

Figure 19:
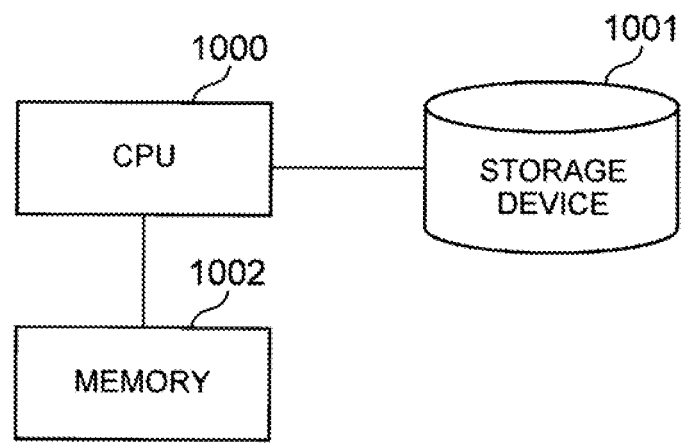
FIG. 19 It depicts a block diagram illustrating an example of a computer having a CPU.

FIG. 19 is a block diagram illustrating an example of the computer having the CPU. The computer is mounted on the network control devices 100 and 120. A CPU 1000 implements each function in the above exemplary embodiments by performing processing according to a program stored in a storage device 1001. In other words, the CPU 1000 implements the functions of the zone dividing unit 102, the path calculation unit 105, the path transmission unit 107, and the presentation unit 110 in the network control device 100 illustrated in FIG. 3, as well as the functions related to computation in other blocks. Moreover, the CPU 1000 implements the functions of the zone dividing unit 102, the path calculation unit 105, the path transmission unit 107, the presentation unit 110, and the identifier conversion unit 111 in the network control device 100 illustrated in FIG. 18, as well as the functions related to computation in other blocks.

The storage device 1001 is, for example, a non-transitory computer readable medium. The non-transitory computer readable medium includes various types of tangible storage media. Specific examples of the non-transitory computer readable medium include a magnetic recording medium (for example, a flexible disk, a magnetic tape, or a hard disk drive), a magneto-optical recording medium (for example, a magneto-optical disk), a compact disc-read only memory (CD-ROM), a compact disc-recordable disc (CD-R), a compact disc-rewritable disc (CD-RW), and a semiconductor memory (for example, a mask ROM, a programmable ROM [PROM], an erasable PROM [EPROM], or a flash ROM). In addition, the storage device 1001 implements the countermeasure device setting storage 104 and the path information storage 106.

Furthermore, the program may be stored in various types of transitory computer readable media. The program is supplied to a transitory computer readable medium via, for example, a wired or wireless communication channel, that is, via an electrical signal, an optical signal, or an electromagnetic wave.

The memory 1002 is implemented by, for example, a random-access memory (RAM) and is a storage that temporarily stores data when the CPU 1000 performs processing. It is also conceivable that a program stored in the storage device 1001 or the transitory computer readable medium is transferred to the memory 1002 so that the CPU 1000 performs processing on the basis of the program in the memory 1002.

Figure 20:
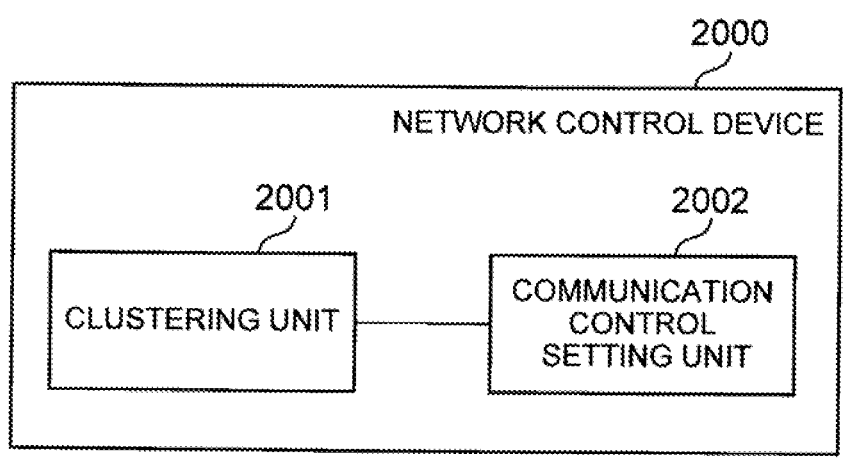
FIG. 20 It depicts a block diagram illustrating an essential part of the network control device.

FIG. 20 is a block diagram illustrating an essential part of the network control device. As illustrated in FIG. 20, a network control device 2000 controls a network in which a plurality of terminals (the communication terminals 600 in the exemplary embodiment) and countermeasure devices (the countermeasure devices 400 in the exemplary embodiment) are present, and the network control device 2000 includes: a clustering unit 2001 (the zone clustering unit 12 and the zone dividing unit 102 in the exemplary embodiment) that refers to terminal information including information with which an incident-detected terminal is able to be identified, information with which a related terminal group suspected of being related to an incident is able to be identified among the plurality of terminals, and an inter-terminal communication history to divide the incident-detected terminal and the related terminal group into a plurality of zones; and a communication control setting unit 2002 (the network control setting unit 13 and the countermeasure device setting transmission unit 103 in the exemplary embodiment) that sets communication control relating to the terminal (the SDN controller 300 in the exemplary embodiment) and the countermeasure device for each of the plurality of zones.

Some or all of the above exemplary embodiments may be described as in the following Supplementary notes, but not limited thereto.

(Supplementary note 1) A network control device for controlling a network where a plurality of terminals and countermeasure devices are present, the network control device comprising:

a clustering unit that divides terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and a communication control setting unit that sets communication control relating to the terminals and the countermeasure devices for each of the plurality of zones.

(Supplementary note 2) The network control device according to Supplementary note 1, wherein the clustering unit creates a graph with the incident-detected terminal and the terminal group suspected of being related to an incident as nodes.

(Supplementary note 3) The network control device according to Supplementary note 2, wherein the clustering unit obtains any number of zones each containing one or more of the incident-detected terminals or of the terminals suspected of being related to an incident after dividing the created graph.

(Supplementary note 4) The network control device according to any one of Supplementary notes 1 to 3, wherein the communication control setting unit applies different settings of the countermeasure device in every zone obtained by the clustering unit.

(Supplementary note 5) The network control device according to any one of Supplementary notes 1 to 4, wherein the communication control setting unit sets different settings of the communication path and communication range in every zone obtained by the clustering unit to the terminal and countermeasure device.

(Supplementary note 6) A network control method for controlling a network where a plurality of terminals and countermeasure devices are present, the network control method comprising:

dividing terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and setting communication control relating to the terminals and the countermeasure devices for each of the plurality of zones.

(Supplementary note 7) The network control method according to Supplementary note 6, further comprising: creating a graph with the incident-detected terminal and the terminal group suspected of being related to an incident as nodes.

(Supplementary note 8) The network control method according to Supplementary note 7, further comprising: obtaining any number of zones each containing one or more of the incident-detected terminals or of the terminals suspected of being related to an incident after dividing the created graph.

(Supplementary note 9) The network control method according to any one of Supplementary notes 6 to 8, further comprising: applying different settings of the countermeasure device in every zone obtained by the dividing.

(Supplementary note 10) The network control method according to any one of Supplementary notes 6 to 9, further comprising: setting different settings of the communication path and communication range in every zone obtained by the clustering unit to the terminal and countermeasure device.

(Supplementary note 11) A network control program causing a computer to perform:

dividing terminals including an incident-detected terminal and the related terminal group into a plurality of zones, on the basis of terminal information including information with which an incident-detected terminal is able to be identified, information with which a related terminal group suspected of being related to an incident is able to be identified among the plurality of terminals, and an inter-terminal communication history; and setting communication control relating to the terminals and the countermeasure devices for each of the plurality of zones.

(Supplementary note 12) The network control program according to Supplementary note 11, further causing the computer to perform: creating a graph with the incident-detected terminal and the terminal group suspected of being related to an incident as nodes.

(Supplementary note 13) The network control program according to Supplementary note 12, further causing the computer to perform: obtaining any number of zones each containing one or more of the incident-detected terminals or of the terminals suspected of being related to an incident after dividing the created graph.

(Supplementary note 14) The network control program according to any one of Supplementary notes 11 to 13, further causing the computer to perform: applying different settings of the countermeasure device in every zone obtained by the dividing.

(Supplementary note 15) The network control program according to any one of Supplementary notes 11 to 14, further causing the computer to perform: setting different settings of the communication path and communication range in every zone obtained by the clustering unit to the terminal and countermeasure device.

(Supplementary note 16) A network control program causing a computer to perform the network control method according to any one of Supplementary notes 6 to 10.

Although the present invention has been described with reference to the exemplary embodiments hereinabove, the present invention is not limited thereto. A variety of changes, which can be understood by those skilled in the art, may be made in the configuration and details of the present invention within the scope thereof.

REFERENCE SIGNS LIST

1 Network system
2 Transmission line
3 Network
4 Subnetwork
11 Suspicious terminal group acquisition unit
12 Zone clustering unit
13 Network control setting unit
100, 120 Network control device
101 Terminal information acquisition unit
102 Zone dividing unit
103 Countermeasure device setting transmission unit
104 Countermeasure device setting storage
105 Path calculation unit
106 Path information storage
107 Path transmission unit
108 Countermeasure device output receiving unit
109 Input unit
110 Presentation unit
111 Identifier conversion unit
200 External device 300 SDN controller
400, 400A Countermeasure device
500, 500A SDN-enabled switch
600, 600A, 600B, 600C Communication terminal
1000 CPU
1001 Storage device
1002 Memory
2000 Network control device
2001 Clustering unit
2002 Communication control setting unit

The invention claimed is:

1. A network control device for controlling a network where a plurality of terminals and countermeasure devices are present, the network control device comprising:
a memory storing instructions; and
a processor configured to execute the instructions to implement:
a clustering unit that divides terminals including an incident-detected terminal and a related terminal group into a plurality of zones, on the basis of terminal information including information with which the incident-detected terminal is able to be identified, information with which the related terminal group suspected of being related to an incident is able to be identified among the plurality of terminals, and an inter-terminal communication history; and
a communication control setting unit that sets communication control relating to the terminals and the countermeasure devices for each of the plurality of zones,
wherein the clustering unit creates a graph with the incident-detected terminal and the terminal group suspected of being related to an incident as nodes, and
wherein the clustering unit obtains any number of zones each containing one or more of the incident-detected terminals or of the terminals suspected of being related to an incident after dividing the created graph.

2. The network control device according to claim 1, wherein the communication control setting unit applies different settings of the countermeasure device in every zone obtained by the clustering unit.

3. The network control device according to claim 1, wherein the communication control setting unit sets different settings of the communication path and communication range in every zone obtained by the clustering unit to the terminal and countermeasure device.

4. A network control method for controlling a network where a plurality of terminals and countermeasure devices are present, the network control method comprising:
dividing terminals including an incident-detected terminal and a related terminal group into a plurality of zones, on the basis of terminal information including information with which the incident-detected terminal is able to be identified, information with which the related terminal group suspected of being related to an incident is able to be identified among the plurality of terminals, and an inter-terminal communication history;
setting communication control relating to the terminals and the countermeasure devices for each of the plurality of zones;
creating a graph with the incident-detected terminal and the terminal group suspected of being related to an incident as nodes; and
obtaining any number of zones each containing one or more of the incident-detected terminals or of the terminals suspected of being related to an incident after dividing the created graph.

5. The network control method according to claim 4, further comprising:
applying different settings of the countermeasure device in every zone obtained by the dividing.

6. The network control method according to claim 4, further comprising:
setting different settings of the communication path and communication range in every zone obtained by the clustering unit to the terminal and countermeasure device.

7. A non-transitory computer readable information recording medium storing a network control program that, when executed by a processor, performs:
dividing terminals including an incident-detected terminal and a related terminal group into a plurality of zones, on the basis of terminal information including information with which the incident-detected terminal is able to be identified, information with which the related terminal group suspected of being related to an incident is able to be identified among the plurality of terminals, and an inter-terminal communication history;
setting communication control relating to the terminals and the countermeasure devices for each of the plurality of zones;
creating a graph with the incident-detected terminal and the terminal group suspected of being related to an incident as nodes; and
obtaining any number of zones each containing one or more of the incident-detected terminals or of the terminals suspected of being related to an incident after dividing the created graph.

8. The information recording medium according to claim 7, wherein the network control program further performs: applying different settings of the countermeasure device in every zone obtained by the dividing.

9. The information recording medium according to claim 7, wherein the network control program further performs: setting different settings of the communication path and communication range in every zone obtained by the clustering unit to the terminal and countermeasure device.

* * * * *